United States Patent Office 3,108,092
Patented Oct. 22, 1963

3,108,092
URETHANE POLYMER COMPOSITIONS
Donald H. Russell, Pennsauken, N.J., and Anna M. Karrash, Ridley Park, Pa., assignors to The Atlantic Refining Company, Philadelphia, Pa., a corporation of Pennsylvania
No Drawing. Filed Mar. 20, 1961, Ser. No. 96,701
13 Claims. (Cl. 260—75)

This application is a continuation-in-part of application Serial No. 777,222, filed December 1, 1958, now abandoned.

This invention relates to novel urethane polymer compositions and, more particularly, to urethane polymer compositions prepared from mixtures of short chain alkyl benzene diisocyanates and long chain alkyl benzene diisocyanates.

Urethane polymers may take the form of plastic or resinous materials, solid foam-like materials or rubber-like materials. This invention, however, is concerned specifically with the rubber-like urethane polymers which, chemically, are diisocyanate-linked condensation elastomers. Accordingly, as used herein the term urethane polymer refers specifically to the diisocyanate-linked condensation elastomers.

The diisocyanate-linked condensation elastomers or urethane polymer comprise one class of synthetic rubbers and hence also are known and referred to in the prior art as urethane rubber or polyurethanes. A number of methods have been disclosed for the preparation of these elastomers. For example, these elastomers have been prepared by combining glycol-adipic acid polyesters with naphthalene diisocyanates to lengthen the chain. These chain lengthened polymers are subsequently cross-linked by reaction with water, glycols, diamines or amine alcohols.

Urethane polymers have been prepared from many different individual diisocyanates, such as hexamethylene diisocyanate, tolyene 2,4-diisocyanate, 2-nitrodiphenyl-4,4′ diisocyanate, diphenyl sulfone - 4,4′ - diisocyanate, naphthylene - 1,4-diisocyanate, naphthylene-1,5-diisocyanate, naphthylene-2,7-diisocyanate and fluorene diisocyanates. While the urethane polymers prepared from the foregoing diisocyanates possess some extremely desirable properties such as high abrasion resistance, ozone resistance, tensile strengths superior to those of natural rubber and synthetic GR-S, solvent resistance (especially to hydrocarbons), high tear strengths, high modulus, good resilience and low permeability to gases, they also possess some properties which are extremely undesirable in certain compounded synthetic rubber products. These undesirable properties include poor resistance to acids and alkalis, poor resistance to temperature extremes, gradual saponification in water and other hydrolytic agents, at temperatures greater than 70° C., only moderate low temperature flexibility, immediate hardening, high permanent set, serious blistering tendencies, short shelf life for the uncured polymer and polymers which are extremely difficult to process.

It now has been discovered that urethane polymers prepared from a mixture of a short chain alkyl benzene diisocyanate, such as toluene diisocyanate and a long chain alkyl benzene diisocyanate, wherein the alkyl radical contains from five to eighteen carbon atoms, possess all of the aforementioned advantageous physical properties without any of the undesirable properties of the urethane polymers prepared by prior art methods.

It is, therefore, the principal object of this invention to provide novel urethane polymers.

It is another object of this invention to provide novel urethane polymers which do not possess the inherent disadvantages of the urethane polymers heretofore known.

Other objects will become apparent to those skilled in the art from the description which follows.

As stated above, the novel urethane polymers of this invention are prepared from a mixture of a short chain alkyl benzene diisocyanate and a long chain alkyl benzene diisocyanate.

As used in this specification and appended claims, the term "short chain alkyl benzene diisocyanate" means a mono alkyl benzene diisocyanate wherein the alkyl radical contains from 1 to 4 carbon atoms. Such compounds have the general formula

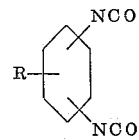

wherein R is an alkyl radical containing from 1 to 4 carbon atoms. Examples of such compounds include toluene-2,4-diisocyanate,
toluene-3,5-diisocyanate,
toluene-2,6-diisocyanate,
ethyl benzene-2,4-diisocyanate,
ethyl benzene-3,5-diisocyanate,
ethyl benzene-2,6-diisocyanate,
propyl benzene-2,4-diisocyanate,
propyl benzene-3,5-diisocyanate,
propyl benzene-2,6-diisocyanate,
isopropyl benzene-2,4-diisocyanate,
isopropyl benzene-3,5-diisocyanate,
isopropyl benzene-2,6-diisocyanate,
n-butyl benzene-2,4-diisocyanate,
n-butyl benzene-3,5-diisocyanate,
n-butyl benzene-2,6-diisocyanate,
sec-butyl benzene-2,4-diisocyanate,
sec-butyl benzene-3,5-diisocyanate,
sec-butyl benzene-2,6-diisocyanate,
t-butyl benzene-2,4-diisocyanate,
t-butyl benzene-3,5-diisocyanate, and
t-butyl benzene-2,6-diisocyanate.

As used in this specification and appended claims, the term "long chain alkyl benzene diisocyanate" means a mono alkyl benzene diisocyanate wherein the alkyl radical may be either normal or branched in structure and contains from 5 to 18 carbon atoms. Such compounds have the general formula

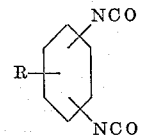

wherein R is an alkyl radical which may be either normal or branched in structure and contains from 5 to 18 carbon atoms. Examples of such compounds include n-amyl benzene-2,4-diisocyanate,
n-amyl benzene-3,5-diisocyanate,
n-amyl benzene-2,6-diisocyanate,
sec-amyl benzene-2,4-diisocyanate,
sec-amyl benzene-3,5-diisocyanate,
sec-amyl-2,6-diisocyanate,
2-methyl butyl benzene-3,5-diisocyanate,
2-methyl butyl benzene-2,6-diisocyanate,
neopentyl benzene-2,4-diisocyanate,
neopentyl benzene-3,5-diisocyanate,
neopentyl-benzene-2,6-diisocyanate,
n-hexyl benzene-2,4-diisocyanate,
n-hexyl benzene-3,5-diisocyanate,
n-hexyl benzene-2,6-diisocyanate,
sec-hexyl benzene-2,4-diisocyanate, sec-hexyl benzene-3,5-diisocyanate,
sec-hexyl benzene-2,6-diisocyanate,
2-methyl pentyl benzene-2,4-diisocyanate,
2-methyl pentyl benzene-3,5-diisocyanate,
2-methyl pentyl benzene-2,6-diisocyanate,
3-methyl pentyl benzene-2,4-diisocyanate,
3-methyl pentyl benzene-3,5-diisocyanate,
3-methyl pentyl benzene-2,6-diisocyanate,
n-heptyl benzene-2,4-diisocyanate,
n-heptyl benzene-2,6-3-methyl hexyl benzene-2,4-diisocyanate,
2-ethyl pentyl benzene-2,4-diisocyanate,
n-octyl benzene-2,4-diisocyanate,
n-octyl benzene-3,5-diisocyanate,
2-ethyl hexyl benzene-2,4-diisocyanate,
n-nonyl benzene-2,4-diisocyanate,
3-methyl octyl benzene-3,5-diisocyanate,
n-decyl benzene-2,4-diisocyanate,
2-methyl nonyl benzene-2,6-diisocyanate,
n-undecyl benzene-3,5-diisocyanate,
4-methyl decyl benzene-2,4-diisocyanate,
3-ethyl nonyl benzene-2,6-diisocyanate,
n-dodecyl benzene-2,4-diisocyanate,
2-methyl undecyl benzene-3,5-diisocyanate,
n-tridecyl benzene-2,6-diisocyanate,
n-tridecyl benzene-2,4-diisocyanate,
4-ethyl undecyl benzene-2,6-diisocyanate,
n-tetradecylbenzene-2,4-diisocyanate,
3-methyl-2-ethyl dodecyl benzene-2,4-diisocyanate,
n-hexadecyl benzene-3,5-diisocyanate,
2,3,4-trimethyl tetradecyl benzene-2,4-diisocyanate, and
n-octadecyl benzene-2,4-diisocyanate.

It will be understood that the foregoing examples of short chain alkyl benzene diisocyanates and long chain alkyl benzene diisocyanates is not intended as a complete list of operative alkyl benzene diisocyanates to be used in this invention, but rather are given as illustrative of some of the isomeric forms of mono alkyl benzene diisocyanates which may be employed in this invention.

Toluene diisocyanates are available commercially. Both the short chain alkyl benzene diisocyanates and the long chain alkyl benzene diisocyanates to be used in formulating the novel urethane polymers of this invention may also be prepared by the method disclosed in copending application Serial No. 713,544, filed February 6, 1958, now Patent No. 2,986,576. According to that method alkyl benzene diisocyanates are prepared from the corresponding dinitro alkyl benzenes by first reducing the dinitro compound to the corresponding alkyl benzene diamine either by a vapor phase catalytic hydrogenation procedure or by means of a liquid phase reduction. The alkyl benzene diamine is dissolved in a suitable solvent, such as ethyl acetate, and reacted with an excess of phosgene to produce the corresponding alkyl benzene carbamyl chlorides. The solvent is removed by distillation, during which step the alkyl benzene carbamyl chlorides are converted to the alkyl benzene diisocyanates. The alkyl benzene diisocyanates may be further purified by vacuum distillation.

As stated above, it is well known that urethane polymers may be prepared by combining a polyester with a diisocyanate to lengthen the chains which chain lengthened compound is then reacted with a suitable cross-linking agent to form an uncured urethane polymer. Such reactions have been described both in patents and in technical literature; however, it is the novel discovery of this invention that urethane polymers prepared from blends or mixtures of different chain length alkyl benzene diisocyanates have new and unexpected properties, which properties are not possessed by the urethane polymers prepared from either of the individual components of the mixture.

The novel urethane polymers of this invention are prepared from a mixture of from about 10 mole percent to about 90 mole percent of a short chain alkyl benzene diisocyanate such as toluene-2,4-diisocyanate, and from about 90 mole percent to about 10 mole percent of a long chain alkyl benzene-2,4-diisocyanate wherein the alkyl radical contains more than four carbon atoms and which alkyl radical may be either normal or branched in structure.

In a preferred embodiment the novel urethane polymers are prepared from a mixture of from about 25 mole percent to about 75 mole percent of toluene-2,4-diisocyanate and from about 75 mole percent to about 25 mole percent of an alkyl benzene-2,4-diisocyanate wherein the alkyl radical contains from five to eighteen carbon atoms and which alkyl radical may be either normal or branched in structure. Although it has been stated that the urethane polymers of this invention are prepared from a mixture of short chain alkyl benzene diisocyanates and long chain alkyl benzene diisocyanates it is to be understood that the novel urethane polymers are prepared by first condensing a polyester with a mixture of a short chain alkyl benzene diisocyanate and a long chain alkyl benzene diisocyanate to form a chain lengthened compound which is then reacted with a cross-linking agent to form an uncured urethane polymer which is cured under suitable conditions of temperature and pressure.

Suitable polyester materials to be used in the preparation of the novel urethane polymers of this invention are the hydroxyl terminated polyesters of dicarboxylic acids and glycols and include the so-called glycol-adipic acid polyesters such as those prepared by condensing ethylene glycol and propylene glycol with adipic acid. For the purposes of this invention these polyesters should have a molecular weight of at least 1300, a relatively low neutralization number ranging from about 0.3 to about 0.9 and a hydroxyl number ranging between about 85 and 105. Neutralization number is defined as a measure of the free carboxylic acid contained in the polyester. Hydroxyl number is defined as the milligrams of KOH per gram of polyester and is determined by adding pyridine and acetic anhydride to the polyester and titrating the acetic acid thus formed with a standardized KOH solution.

Any of the conventional cross-linking agents may be utilized in preparing the novel urethane polymers of this invention including water, glycols, diamines or amine alcohols. It is most preferred in this invention that the cross-linking be accomplished by means of an aromatic diamine such as toluene-2,4-diamine.

The novel urethane polymers of this invention are prepared by first condensing from about 0.8 to about 1.2 moles of a glycol-adipic acid polyester with from about 1.6 moles to about 1.85 moles of a mixture of a short chain alkyl benzene-2,4-diisocyanate and a long chain alkyl benzene-2,4-diisocyanate. A molar excess of diisocyanate mixture is essential in this initial condensation reaction. If this condensation reaction were conducted using a one to one molar ratio of polyester to diisocyanate, the chain lengthened polyester compound would not contain a sufficient number of reactive diisocyanate groups to insure the complete cross-linking of the chain lengthened polyester compound with a diamine.

This condensation reaction is conducted at from about 120° C. to about 140° C. for from about 25 minutes to about 40 minutes, and there is formed a "prepolymer" or chain lengthened compound, i.e. polyester polymers linked together with the diisocyanates. After this prepolymer formation, there is added from about 0.48 moles to about 0.95 moles of toluene-2,4-diamine, and the resulting mixture is cured at from about 140° C. to about 160° C. for a period of time ranging between about 1 hour to about 3 hours under a pressure of from about 1000 p.s.i.g. to about 2500 p.s.i.g. After this curing operation there is obtained a rubbery urethane polymer.

It is most preferred in the preparation of the novel urethane polymers of this invention to condense about 1 mole of a glycol-adipic acid polyester with about 1.68 moles of a mixture composed of about 30 mole percent of toluene-2,4-diisocyanate and about 70 mole percent of an alkyl benzene-2,4-diisocyanate wherein the alkyl radical contains from five to eighteen carbon atoms and which alkyl radical may be either normal or branched in structure. This mixture is heated at approximately 130° C. for about 30 minutes to form the prepolymer. After this prepolymer formation there is added about 0.54 mole of toluene-2,4-diamine. The reaction mass is cured at about 150° C. for about 2 hours under a pressure of about 2000 p.s.i.g. After this curing operation there is obtained a rubbery urethane polymer.

The advantageous properties possessed by the novel urethane polymers of this invention are not possessed by urethane polymers prepared using only the toluene diisocyanates or urethane polymers prepared using only the alkyl benzene diisocyanates wherein the alkyl radical contains from five to eighteen carbon atoms or by any other urethane polymer prepared from a single diisocyanate. These novel urethane polymers have: good resistance to temperature extremes, no noticeable saponification in boiling water, no immediate hardening properties, a relatively low permanent set, no tendency toward blistering, a relatively long shelf life, and have a superior resistance to acids and alkalis. In addition to these important advantages, these polymers are easy to process.

Urethane polymers heretofore considered as being commercially acceptable were those prepared from toluene diisocyanates. Such polymers have a certain number of desirable physical and chemical properties important in the compounding of specific synthetic rubber products. Thus, although urethane polymers prepared from toluene diisocyanates have found some commercial acceptance in the synthetic rubber and plastics industry, research workers in this field are constantly striving to develop new urethane polymers which not only possess the aforementioned desirable properties of urethane polymers in general, but also overcome the undesirable properties possessed by these urethane polymers.

As stated above, the urethane polymers of this invention have properties which make them extremely desirable as raw materials in the compounding of certain synthetic rubber and plastic materials. For example, they possess a much greater resistance to temperature extremes than urethane polymers prepared from toluene diisocyanates. They exhibit only a slight softening at temperatures approximating 400° F. whereas urethane polymers prepared from toluene diisocyanates are more in the nature of a thick syrup at temperatures of about 400° F. The urethane polymers of this invention are acceptable in compounding synthetic rubber and plastic materials for use at temperatures of about −40° F.

The time to harden and the ease of processing are interrelated properties. The urethane polymers of this invention are easier to process than polymers prepared from toluene diisocyanates since they require from 20–30 times longer to harden as compared to urethane polymers prepared from toluene diisocyanates.

The urethane polymers of this invention have a permanent set of approximately 5 percent whereas the urethane polymers prepared from toluene diisocyanates have a permanent set of about 6 percent.

While neither urethane polymers prepared from toluene diisocyanates nor the urethane polymers of this invention, exhibit any tendency toward blistering, the polymers prepared from toluene diisocyanates tend to bubble during the curing operation and extreme care must be taken to exclude these bubbles from the finished product. The novel polymers of this invention do not possess this inclination to bubble during the curing operation.

The shelf life of the urethane polymers prepared from toluene diisocyanates is relatively short, i.e. approximately one week, whereas the urethane polymers of this invention have a relatively long shelf life, i.e. approximately two months. The property of shelf life as applied to urethane polymers is most important from the aspect of auto polymerization. Heretofore uncured urethane polymers had a tendency to interreact with atmospheric moisture and in so doing would destroy the reactivity of the isocyanate groups. Due to this unique property, it was believed that uncured urethane polymers would have to be used in compounding finished materials almost as soon as the uncured polymer was prepared. The novel polymers of this invention, however, obviate this need for immediate processing, and allow time for other considerations such as transportation and storage of the uncured polymer. This property is particularly important when related to the processing life. The longer processing life of the instant urethane polymers allows for a longer milling time and, as such allows a sufficient length of time for the incorporation of various fillers and pigments into these urethane polymers when compounding them into commercial synthetic rubber products.

A most surprising property possessed by these materials which is not evidenced by the urethane polymers of the prior art is their resistance to boiling water and to acids and alkalis.

A sample of a cured urethane polymer of this invention was subjected to the action of boiling water for a period of approximately 48 hours. At the end of this time, there was no noticeable change in the polymer and no indication of saponification was noticed.

Another sample of a cured urethane polymer of this invention was subjected to the action of boiling aqueous five percent hydrochloric acid for about one hour. No change in the polymer was observed upon its removal from the boiling hydrochloric acid.

Another sample of the novel urethane polymer of this invention was subjected to the action of boiling aqueous five percent sodium hydroxide for about one hour. With the exception of a superficial surface discoloration, there appeared to be no attack on the polymer by the caustic.

The following examples are intended as illustrative of certain specific embodiments of this invention but are not to be construed as limiting the invention thereto.

EXAMPLE I

A polyester was prepared according to the conventional method of reacting 6 moles of adipic acid with 1.8 moles of propylene glycol and 16.2 moles of ethylene glycol. The resultant polyester was a waxy solid having a melting point of approximately 37° C. This polyester had a hydroxyl number of 86, a neutralization number of 0.42 and a molecular weight of 1300.

One mole of the above-described polyester was reacted with 1.68 moles of a commercial toluene-2,4-diisocyanate supplied by the Mobay Chemical Company. The reaction mixture was heated for thirty minutes at 130° C. and there was added 0.54 mole of toluene-2,4-diamine. The reaction mass was cured for two hours at 150° C. and 2000 p.s.i. After curing there was obtained a solid rubbery urethane polymer, the properties of which are presented and compared with the properties of other urethane polymers in Table I.

EXAMPLE II

One mole of the polyester as prepared in Example I was reacted with 1.68 moles of n-amyl benzene-2,4-diisocyanate. The mixture was heated for thirty minutes at 130° C. after which there was added 0.54 mole of toluene-2,4-diamine. The reaction mass was cured for two hours at 150° C. and 2000 p.s.i. After curing there was obtained a solid rubbery urethane polymer, the properties of which are presented and compared with the properties of other urethane polymers in Table I.

EXAMPLE III

One mole of the polyester as prepared in Example I was mixed with a mixture composed of 0.5 mole of n-amyl benzene-2,4-diisocyanate and 1.18 moles of toluene-2,4-diisocyanate. The reaction mass was heated for thirty minutes at 130° C. after which there was added 0.54 mole of toluene-2,4-diamine. The entire mixture was cured for two hours at 150° C. and 2000 p.s.i. After curing there was obtained a solid rubbery urethane polymer. The properties of this polymer are presented and compared with the properties of other urethane polymers in Table I.

EXAMPLE IV

One mole of the polyester as prepared in Example I was mixed with a mixture composed of 0.5 mole of isoamyl benzene-2,4-diisocyanate and 1.18 moles of toluene-2,4-diisocyanate. The reaction mass was heated for thirty minutes at 130° C. after which there was added 0.54 mole of toluene-2,4-diamine. The entire mixture was cured for two hours at 150° C. and 2000 p.s.i. After curing there was obtained a solid rubbery urethane polymer. The properties of this polymer are presented and compared with the properties of other urethane polymers in Table I.

EXAMPLE V

One mole of the polyester as prepared in Example I was mixed with a mixture composed of 0.5 mole of 2-methyl butyl benzene-2,4-diisocyanate and 1.18 moles of toluene-2,4-diisocyanate. The reaction mass was heated for thirty minutes at 130° C. after which there was added 0.54 mole of toluene-2,4-diamine. The entire mixture was cured for two hours at 150° C. and 2000 p.s.i. After curing there was obtained a solid rubbery urethane polymer. The properties of this polymer are presented and compared with the properties of other urethane polymers in Table I.

EXAMPLE VI

One mole of the polyester as prepared in Example I was mixed with a mixture composed of 0.5 mole of 3-methyl butyl benzene-2,4-diisocyanate and 1.18 moles of toluene-2,4-diisocyanate. The reaction mass was heated for thirty minutes at 130° C. after which there was added 0.54 mole of toluene-2,4-diamine. The entire mixture was cured for two hours at 150° C. and 2000 p.s.i. After curing there was obtained a solid rubbery urethane polymer. The properties of this polymer are presented and compared with the properties of other urethane polymers in Table I.

EXAMPLE VII

One mole of the polyester as prepared in Example I was mixed with a mixture composed of 0.5 mole of t-amyl benzene-2,4-diisocyanate and 1.18 moles of toluene-2,4-diisocyanate. The reaction mass was heated for thirty minutes at 130° C. after which there was added 0.54 mole of toluene-2,4-diamine. The entire mixture was cured for two hours at 150° C. and 2000 p.s.i. After curing there was obtained a solid rubbery urethane polymer. The properties of this polymer are presented and compared with the properties of other urethane polymers in Table I.

In the above table the physical properties Tensile Strength at Break, Age Hardening, and Toughness are defined, respectively, as the tensile strength of a sample calculated for the cross-sectional area at the moment of break, rather than the initial cross-sectional area as measured in ASTM D412-51T; the change in Shore durometer (A scale) hardness after 12 hours at 275° F. to 325° F.; and the maximum torsional force required to cut through a ¼ inch thick sheet of cured urethane polymer.

The above table clearly demonstrates both the novel and unexpected properties possessed by the urethane polymer prepared in Examples III, IV, V, VI, and VII, which properties are not possessed by the urethane polymers prepared in either Example I or Example II, nor would the properties possessed by the urethane polymer in Examples III to VII be expected from the data obtained on the individual urethane polymers of Examples I and II. For example, from the data presented in Table I for the urethane polymer obtained in Example I and from the data presented in Table I for the urethane polymer obtained in Example II, one might expect, purely on a mathematical basis, to find an additive effect for the properties of the polymers prepared in Examples IV to VII but which effect would be extremely unlikely; or more likely an averaging effect to be present in the properties of the urethane polymer prepared in Examples III to VII. This is obviously not the case in view of the entire data presented in Table I.

To illustrate, if the effect were additive, a result of approximately 8700 p.s.i. would be expected for the tensile strength for the urethane polymer prepared in Example III. If, however, a more realistic approach is taken, on would expect an averaging result for the tensile strength and a result of approximately 4690 p.s.i. would be expected for the urethane polymer prepared in Example III in view of the results of the tensile strength of the urethane polymers prepared in Examples I and II. Instead it will be seen that the value of the properties obtained for the urethane polymer of Example III is greater than that observed for either of the polymers of Examples I and II and thus also above their average. Furthermore, one would expect an ultimate elongation of 570 percent for the urethane polymers prepared in Example III based upon a weighted average of the data obtained for the individual components as prepared in Example I and Example II. In this instance also the value obtained was higher than that for either of the components prepared in Example I and Example II and also above their weighted average. In a similar manner it is shown that the remaining properties of the urethane polymers prepared in Examples III to VII are significantly different and unexpected when observed in view of the data obtained on the properties of the urethane polymers prepared in Examples I and II.

The novel urethane polymers of this invention are particularly useful in compounding heavy duty truck, bus, passenger car and aircraft tires, conveyer and driving belts, shoe heels and soles, friction wheels, hydraulic gaskets, oil seals, chute linings such as those used for

*Table I*

| Physical Properties | Urethane Polymer From Example I | Urethane Polymer From Example II | Urethane Polymer From Example III | Urethane Polymer From Example IV | Urethane Polymer From Example V | Urethane Polymer From Example VI | Urethane Polymer From Example VII |
|---|---|---|---|---|---|---|---|
| Tensile Strength [1] (p.s.i.) | 5,200 | 3,500 | 6,000 | 5,800 | 5,900 | 5,900 | 5,750 |
| Ultimate Elongation [2] (percent) | 600 | 500 | 800 | 700 | 750 | 750 | 750 |
| Tensile Strength at Break (p.s.i.) | 28,500 | 17,000 | 42,000 | 40,000 | 38,000 | 38,000 | 41,000 |
| Compression Set [3] (percent) | 6 | 10 | 5 | 5 | 5 | 5 | 5 |
| Tear Strength [4] (lb./in.) | 336 | 306 | 356 | 348 | 345 | 345 | 350 |
| Age Hardening | 7-10 | 9-10 | 1-2 | 2-4 | 1-3 | 1-3 | 2-3 |
| Toughness | 3 | 10 | 2 | 2 | 2 | 2 | 2 |

[1] ASTM D412-51T, Die D.
[2] ASTM D412-51T.
[3] ASTM D395-55, Method B.
[4] ASTM D624-54, Die, C.

the transportation of abrasive materials, shock absorption gears, tubing which comes into contact with hydrocarbon materials, varnishes, lacquers, and various coatings for paper and cloth.

We claim:

1. Urethane polymer composition comprising the reaction product of an aromatic diamine and a prepolymer formed by condensing an ethylene propylene glycol adipate with a molar excess of a mixture of from about 10 mole percent to about 90 mole percent of a short chain alkyl benzene diisocyanate and about 90 mole percent to about 10 mole percent of a long chain alkyl benzene diisocyanate, said ethylene propylene glycol adipate being a hydroxyl terminated polyester of adipic acid and ethylene glycol and propylene glycol and having a molecular weight of at least 1300, a neutralization number of from 0.3 to 0.9, and a hydroxyl number of from 85 to 105, said short chain alkyl benzene diisocyanate selected from the group consisting of toluene diisocyanate, ethylbenzene diisocyanate, propylbenzene diisocyanate, and butyl benzene diisocyanate; said long chain alkyl benzene diisocyanate having the general formula

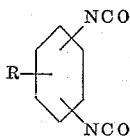

wherein R is an alkyl radical containing from 5 to 18 carbon atoms.

2. Urethane polymer composition comprising the reaction product of an aromatic diamine and a prepolymer formed by condensing an ethylene propylene glycol adipate with a molar excess of a mixture of from about 25 mole percent to about 75 mole percent of a short chain alkyl benzene diisocyanate and about 75 mole percent to about 25 mole percent of a long chain alkyl benzene diisocyanate, said ethylene propylene glycol adipate being a hydroxyl terminated polyester of adipic acid and ethylene glycol and propylene glycol and having a molecular weight of at least 1300, a neutralization number of from 0.3 to 0.9, and a hydroxyl number of from 85 to 105, said short chain alkyl benzene diisocyanate selected from the group consisting of toluene diisocyanate, ethyl benzene diisocyanate, propyl benzene diisocyanate, and butyl benzene diisocyanate; said long chain alkyl benzene diisocyanate having the general formula

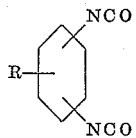

wherein R is an alkyl radical containing from 5 to 18 carbon atoms.

3. Urethane polymer composition comprising the reaction product of toluene-2,4-diamine and a prepolymer formed by condensing an ethylene propylene glycol adipate with a molar excess of a mixture of from about 25 mole percent to about 75 mole percent of a short chain alkyl benzene diisocyanate and about 75 mole percent to about 25 mole percent of a long chain alkyl benzene diisocyanate, said ethylene propylene glycol adipate being a hydroxyl terminated polyester of adipic acid and ethylene glycol and propylene glycol and having a molecular weight of at least 1300, a neutralization number of from 0.3 to 0.9, and a hydroxyl number of from 85 to 105, said short chain alkyl benzene diisocyanate selected from the group consisting of toluene diisocyanate, ethyl benzene diisocyanate, propyl benzene diisocyanate, and butyl benzene diisocyanate having the general formula

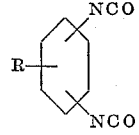

wherein R is an alkyl radical containing from 5 to 18 carbon atoms.

4. Urethane polymer compositions comprising the reaction product of toluene-2,4-diamine and a prepolymer formed by condensing an ethylene propylene glycol adipate with a molar excess of a mixture of from about 10 mole percent to about 90 mole percent of toluene-2,4-diisocyanate and from about 90 mole percent to about 10 mole percent of n-amyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

5. Urethane polymer compositions comprising the reaction product of toluene-2,4-diamine and a prepolymer formed by condensing an ethylene propylene glycol adipate with a molar excess of a mixture of from about 25 mole percent to about 75 mole percent of toluene-2,4-diisocyanate and from about 75 mole percent to about 25 mole percent of n-amyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

6. Urethane polymer compositions comprising the reaction product of toluene-2,4-diamine and a prepolymer formed by condensing an ethylene propylene glycol adipate with a molar excess of a mixture of from about 10 mole percent to about 90 mole percent of toluene-2,4-diisocyanate and from about 90 mole percent to about 10 mole percent of iso-amyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

7. Urethane polymer compositions comprising the reaction product of toluene-2,4-diamine and a prepolymer formed by condensing an ethylene propylene glycol adipate with a molar excess of a mixture of from about 25 mole percent to about 75 mole percent of toluene-2,4-diisocyanate and from about 75 mole percent to about 25 mole percent of iso-amyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

8. Urethane polymer compositions comprising the reaction product of toluene 2,4-diamine and a prepolymer formed by condensing an ethylene propylene glycol adipate with a molar excess of a mixture of from about 10 mole percent to about 90 mole percent of toluene-2,4-diisocyanate and from about 90 mole percent to about 10 mole percent of 2-methyl butyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

9. Urethane polymer compositions comprising the reaction product of toluene-2,4-diamine and a prepolymer formed by condensing an ethylene propylene glycol adipate with a molar excess of a mixture of from about 25 mole percent to about 75 mole percent of toluene-2,4-diisocyanate and from about 75 mole percent to about 25 mole percent of 2-methyl butyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

10. Urethane polymer compositions comprising the reaction product of toluene-2,4-diamine and a prepolymer formed by condensing an ethylene propylene glycol adipate with a molar excess of a mixture of from about 10 mole percent to about 90 mole percent of toluene-2,4-diisocyanate and from about 90 mole percent to about 10 mole percent of 3-methyl butyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

11. Urethane polymer compositions comprising the reaction product of toluene-2,4-diamine and a prepolymer formed by condensing an ethylene propylene glycol adipate with a molar excess of a mixture of from about 25 mole percent to about 75 mole percent of toluene-2,4-diisocyanate and from about 75 mole percent to about 25 mole percent of 3-methyl butyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

12. Urethane polymer compositions comprising the reaction product of toluene-2,4-diamine and a prepolymer formed by condensing an ethylene propylene glycol adipate with a molar excess of a mixture of from about 10 mole percent to about 90 mole percent of toluene-2,4-diisocyanate and from about 90 mole percent to about 10 mole percent of t-amyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

13. Urethane polymer compositions comprising the reaction product of toluene-2,4-diamine and a prepolymer formed by condensing an ethylene propylene glycol adipate with a molar excess of a mixture of from about 25 mole percent to about 75 mole percent of toluene-2,4-diisocyanate and from about 75 mole percent to about 25 mole percent of t-amyl benzene-2,4-diisocyanate, said ethylene propylene glycol adipate being a hydroxyl terminated polyester of adipic acid and ethylene glycol and propylene glycol and having a molecular weight of at least 1300, a neutralization number of from 0.3 to 0.9 and a hydroxyl number of from 85 to 105.

References Cited in the file of this patent
UNITED STATES PATENTS

| | | |
|---|---|---|
| 2,888,411 | Pace | May 26, 1959 |
| 2,888,413 | Pace | May 26, 1959 |
| 2,986,576 | Bonetti | May 30, 1961 |